United States Patent

Ruttinger, Sr.

[11] Patent Number: 5,688,570
[45] Date of Patent: Nov. 18, 1997

[54] METHOD AND APPARATUS FOR FORMING A MULTI-LAYER PREFORM

[75] Inventor: Frank A. Ruttinger, Sr., Newman, Ga.

[73] Assignee: Crown Cork & Seal Company, Inc., Philadelphia, Pa.

[21] Appl. No.: 543,130

[22] Filed: Oct. 13, 1995

[51] Int. Cl.[6] .............. B29D 22/00; A21C 3/00; B29C 39/02
[52] U.S. Cl. .............. 428/35.7; 428/36.91; 428/167; 428/213; 428/542.8; 425/500; 425/522; 425/525; 425/532; 264/513; 264/515; 264/537; 264/539; 215/12.2
[58] Field of Search .............. 428/182, 35.7, 428/36.91, 172, 213, 542.8, 167; 425/525, 522, 532, 533, 500; 264/513, 516, 247, 250, 274, 505, 259, 515, DIG. 33, 537, 539; 215/12.1, 12.2

[56] References Cited

U.S. PATENT DOCUMENTS

| | | | |
|---|---|---|---|
| 4,307,137 | 12/1981 | Ota et al. | 428/161 |
| 4,424,834 | 1/1984 | Sumi et al. | 428/217 |
| 4,615,925 | 10/1986 | Nilsson | 428/35 |
| 4,744,742 | 5/1988 | Aoki | 425/126.1 |
| 4,808,105 | 2/1989 | Linss et al. | 425/529 |
| 4,826,940 | 5/1989 | Amano et al. | 526/61 |
| 4,895,504 | 1/1990 | Kudert et al. | 425/133.1 |
| 4,948,016 | 8/1990 | Summons et al. | 428/163 |
| 5,044,923 | 9/1991 | Przytulla | 425/525 |
| 5,255,889 | 10/1993 | Collette et al. | 249/102 |
| 5,262,119 | 11/1993 | Smith | 264/513 |
| 5,301,838 | 4/1994 | Schmidt et al. | 222/95 |

*Primary Examiner*—Donald Loney
*Attorney, Agent, or Firm*—Woodcock Washburn Kurtz Mackiewicz & Norris LLP

[57] ABSTRACT

A preform mold assembly for the injection molding of a multi-layer preform for use in the blow molding of container. The preform mold assembly comprises a preform mold having a gate for receiving molten plastic material. The preform mold has a cavity with longitudinal axis and defines an inner surface. A core-pin is situated within the cavity and spaced from said inner surface. A preform cavity is formed between the inner surface of the cavity and the core-pin for receiving molten plastic from the gate. A threadsplit portion is situated within the cavity at a location remote from said gate. The inner surface of the cavity defines a plurality of flutes formed generally parallel to the cavity longitudinal axis and extend longitudinally along the inner surface of the mold to the threadsplit portion.

38 Claims, 7 Drawing Sheets

METHOD AND APPARATUS FOR FORMING A MULTI-LAYER PREFORM

FIELD OF THE INVENTION

The present invention relates to the injection molding of preforms for plastic beverage and food containers, and, more particularly, to the injection molding of a multi-layer preform for plastic containers in which each layer may be formed from a different polymeric material, such as virgin and recycled plastic resin materials, and which thereafter will be blow molded into containers.

BACKGROUND OF THE INVENTION

The injection molding and blow molding processes that are employed to manufacture plastic containers are well known in the art. Plastic containers produced by these processes include plastic beverage bottles and food containers. Carbonated beverage and food containers are preferably made from polyethylene terephthalate or copolymers thereof (collectively "PET")

It would be desirable to form plastic beverage and food containers from lower-cost recycled PET material rather than from more expensive virgin polymers. However, in many countries, including the United States, governmental agencies restrict the types of plastic resin material that can be employed to make plastic food and beverage containers. For example, the United States Food and Drug Administration ("FDA") prohibits the use of recycled plastic resin material in the manufacture of beverage and food containers. One reason why the use of recycled resins has been so restricted is the fear that the processes employed to recycle the resin materials may be insufficient to rid the material of harmful toxic or other biological contaminants, or that the recycling process itself may add harmful toxic or biological contaminants to the plastic resin material.

It is an object of the present invention to form plastic containers made, at least in part, from lower-cost recycled polymers but which satisfy the requirements of the FDA and like organizations.

One method that might be used for making beverage and food containers from recycled polymers involves the use of a multi-layer container, in which the layer that is to be in contact with the contents of the container is made from virgin polymer but the outer layer is formed of less expensive recycled polymeric material.

Another object of the present invention is to form such a multi-layer container.

The use of multi-layer containers has been frustrated by difficulties encountered in connection with the injection molding of multi-layer preforms used to form the containers.

It is yet another object of the present invention to provide a method and apparatus for injection molding of multi-layer preforms to provide food or beverage containers, the preforms being comprised at least in part of lower-cost recycled plastic resins, and at least in part of virgin polymer so that the containers blow molded from such preforms will satisfy the requirements of the FDA.

There are two basic injection-blow molding processes utilized to form plastic containers. These include the single step process, and the two-step (reheat and blow) process. In either process, a preform is first formed by injection molding. After the preform has been injection molded, it is transferred to a blow mold where the preform is blown into the shape of the desired container. In the single step blow molding process, molten plastic is first injection molded into a preform. The preform, without first having been cooled to room temperature, is then stretched and blown into the desired article in a blow mold. In contrast, in the two stage process, molten plastic material is injection molded into a preform which is then cooled to room temperature and stored until it is later blown in the blow mold.

In either process, the injection molding equipment used generally comprises an injection nozzle, a cavity, a thread-split finish area, and a core-rod assembly. The preform is formed in the preform cavity created between the cavity and core-rod assembly. When multi-layer preforms are injection molded in such injection molding equipment special problems are encountered. In the injection molding of multi-layer preforms, a thin preform substrate is first injection molded from a first polymeric material. The thin preform substrate has the general shape of the final multi-layer preform but is much thinner than the final preform. After it has been injection molded, the thin preform substrate is removed from the first injection mold and transferred to a second injection mold in which a second layer of a polymeric material, different from the first, is molded over the thin preform substrate. This process, referred to as "overmolding", may be repeated until the desired number of layers has been injection molded over the previously formed layers.

When conventional injection molds are used to form the thin layer preform substrate portion of a multi-layer preform, problems are encountered. In such cases, because of the small dimensions of the thin layer of the preform substrate, the molten plastic encounters a relatively high resistance to flow and requires correspondingly high injection pressures after it passes through the gate and into the preform cavity. Therefore, when the molten plastic material is injected, it may cool and harden before the plastic material completely fills the mold cavity and threadsplit.

It is, therefore, an object of the present invention to provide a method and apparatus that facilitate the filling of the preform mold cavity and threadsplit with the molten plastic material before the molten plastic can prematurely cool and harden.

Another problem that may arise when using conventional injection molding methods and apparatus to form multi-layer preforms is that during formation of the first thin preform substrate the relatively high injection pressures and flow resistance may cause unwanted deflection of the core-pin. The core-pin deflection can cause the molten material to flow to one side of the cavity and harden in this position, thereby producing a preform with an undesired sidewall material distribution. Such a preform, when blown into a finished container, will likewise exhibit undesired sidewall material distribution.

It is an object of the present invention to provide a method and apparatus that will limit core-pin deflection in the injection molding of multi-layer preforms to amounts within acceptable tolerances.

Yet another problem that may arise when using conventional injection molding methods and apparatus to form multi-layer preforms is that the adhesion at the interface between the two plastic layers of the preform may be inadequate, thus permitting the respective layers of the preform to delaminate. Such delamination may result in a container lacking the strength necessary to contain a carbonated beverage.

It is an object of the present invention to provide a method and apparatus for producing a multi-layer preform that will improve lamination and that can be blow molded into a container having strength sufficient to permit its use as a package for a carbonated beverage.

SUMMARY OF THE INVENTION

The present invention provides a preform mold assembly for injection molding a multi-layer preform for use in the blow molding of containers. The preform mold assembly comprises a preform mold having a gate for receiving molten plastic material, and including a cavity defining an inner surface. A core-pin spaced from the inner surfaces situated within the cavity. The inner surface of the cavity and the core-pin cooperate to form a preform cavity for receiving molten plastic from the gate. The cavity inner surface includes a plurality of flutes extending longitudinally from the gate along the cavity inner surface.

The present invention also provides a method of injection molding a multi-layer preform for use in the blow molding of containers. The method comprises the steps of providing a preform mold assembly having a preform mold. The preform mold has a gate for receiving molten plastic material and a cavity which defines an inner surface. A core-pin is situated within the cavity and is spaced from the inner surface. A preform cavity is formed between the inner surface of the cavity and the core-pin for receiving molten plastic material from the gate. The inner surface of the cavity has a plurality of flutes extending longitudinally from the gate along the inner surface of the cavity. A first molten plastic material is injected into the gate to form a thin preform substrate. A second molten plastic material is then injected over the preform substrate to form the second layer of a multi-layer perform. Next, the multi-layer preform is removed from the second injection mold.

The present invention also provides an improved multi-layer preform. The improved multi-layer preform comprises at least a first inner layer made of a first plastic material having a corrugated surface. The corrugated surface defines a plurality of flutes having a side wall and an axis. A second outer layer made of a second plastic material is bonded together at the corrugated surface.

BRIEF DESCRIPTION OF THE DRAWINGS

The accompanying drawings which are incorporated in and constitute a part of the specification, illustrate one embodiment of the present invention and, together with the description, serve to explain the principles of the invention.

The invention will now be further described by way of example, with reference to the accompanying drawings, in which.

DETAILED DESCRIPTION OF THE PREFERRED EMBODIMENT

Reference will now be made to the method and apparatus for forming a multi-layer preform in accordance with the present invention. It is noted that the method and apparatus described below is applied to any preform for forming almost any shape and size multi-layer preform. By way of example only, and without limiting the aspects of the present invention in any way, the detailed description that follows describes only a multi-layer preform having a substantially tubular shape which will be blow molded into a container having a neck portion diameter that is substantially narrower than the container body diameter. The detailed description could have been directed towards the present invention as applied to a multi-layer preform having a substantially conical or frusto-conical shape that will be blow molded into a wide neck container wherein the neck portion diameter is nearly the same as the container body. It is again noted that like components that are a part of different embodiments are given like reference numerals.

Figure 1:
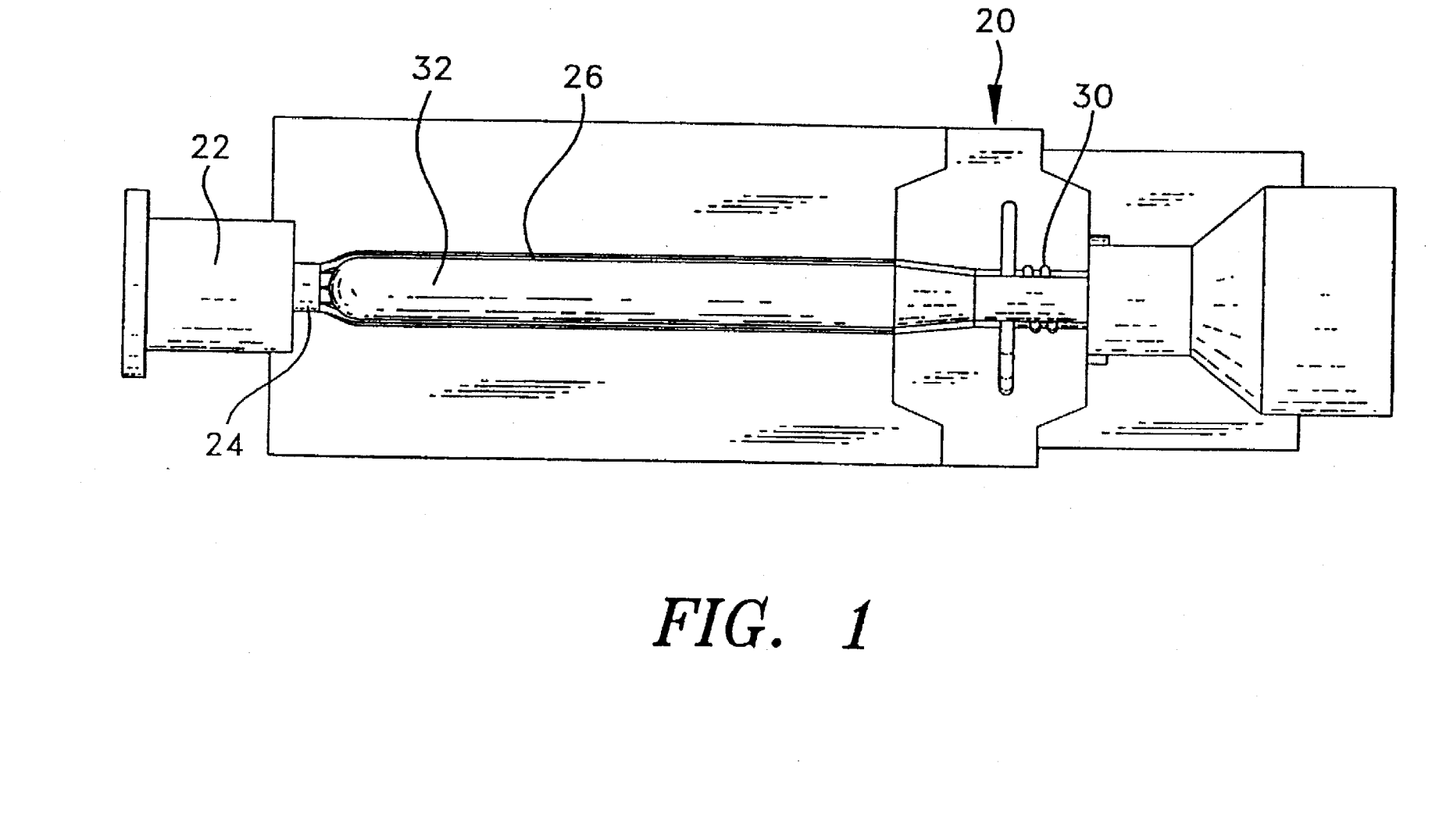
FIG. 1 is a plan view of an injection mold assembly in accordance with one embodiment of the present invention, with one mold half being shown (the other mold half having been removed for the sake of clarity) and having the core-pin and threadsplit portion installed.
Figure 2:
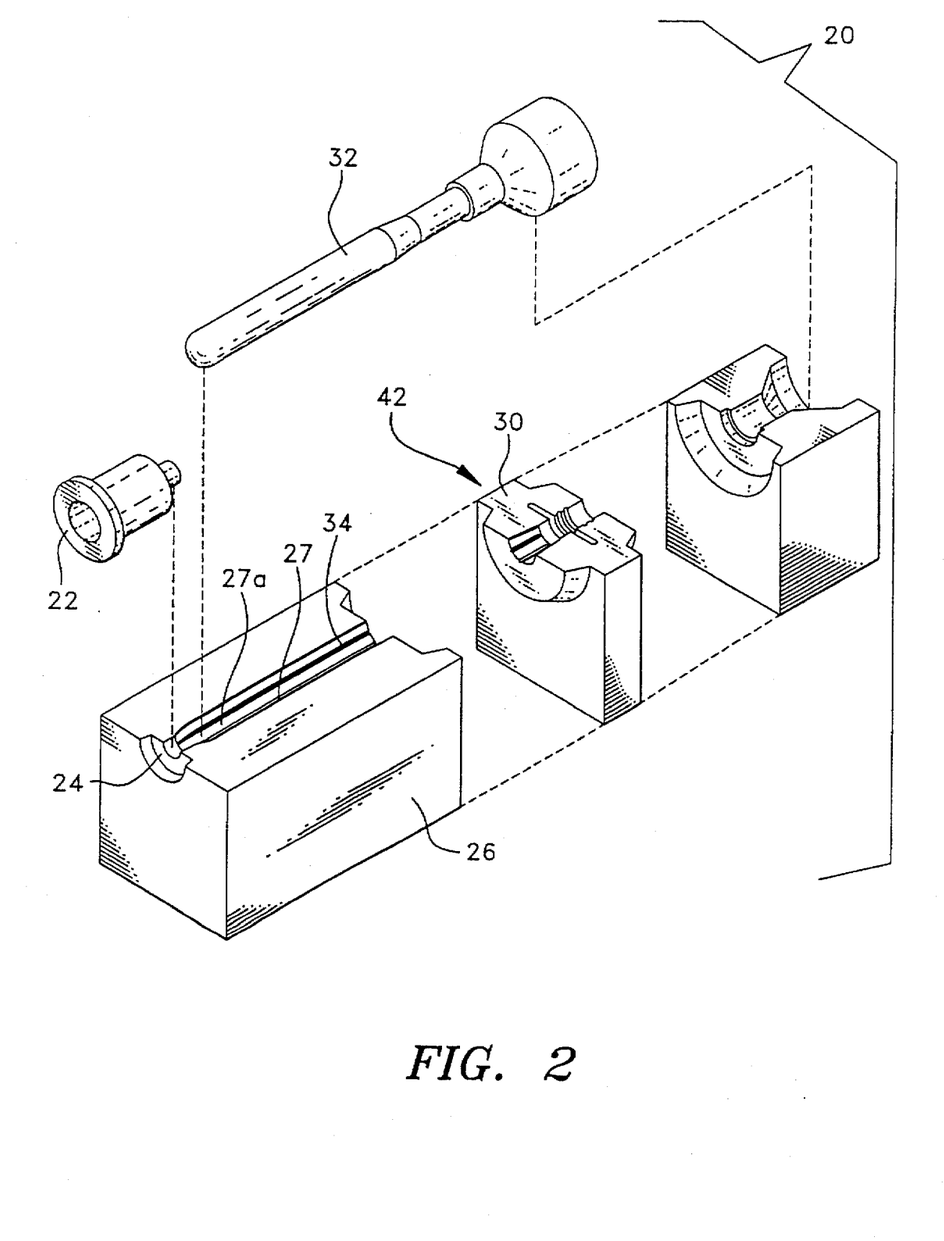
FIG. 2 is an exploded view of the injection mold assembly of FIG. 1, with the core-pin, injection nozzle and threadsplit removed from the mold half.

Referring first to FIGS. 1 and 2, a preform mold assembly 20 in accordance with the present invention is shown. The preform mold assembly 20 includes a cavity half 26, it being understood that another, mating cavity half (not shown) is likewise provided. The mold assembly 20 includes a cavity 26, having a longitudinal axis and a inner surface 26a that extends longitudinally along the length of the cavity half 26. A core-pin assembly 32 is situated within the cavity and spaced from the core inner surface 27a and between the cavity 26, thereby defining a preform cavity 28 for forming an inner substrate of a multi-layer preform. Entrance to the preform cavity 28 is gained through gate 24 at the input end of the preform cavity 28. An insertable threadsplit mold portion 30 is situated at the remote end of the preform cavity 28.

The mold assembly 20 is designed to be coupled to an injection nozzle 22 at gate 24. Molten plastic is injected from the nozzle 22 to the gate 24. The preform cavity 28 provides a flow path from the gate 24 to the threadsplit mold portion 30 through which molten plastic travels as it forms the desired preform shape.

As may be seen from the exploded view of FIG. 2, in accordance an important aspect of the present invention, the inner surface 26a of the cavity 26 is provided with a plurality of flutes 34 which traverse the cavity inner surface generally parallel to the cavity longitudinal axis. The flutes 34 are connected between the gate 24 and the threadsplit portion 30. The length that the flutes 34 extend and traverse the cavity inner surface may vary. The flutes 34 may extend and traverse the cavity from the gate all the way into the threadsplit. The purpose of the flutes 34 will be fully explained below. It is noted that, when it is desired to produce a preform having a threadless neck portion, the threadsplit portion 30 will not be incorporated into the preform mold assembly 20.

Figure 3:
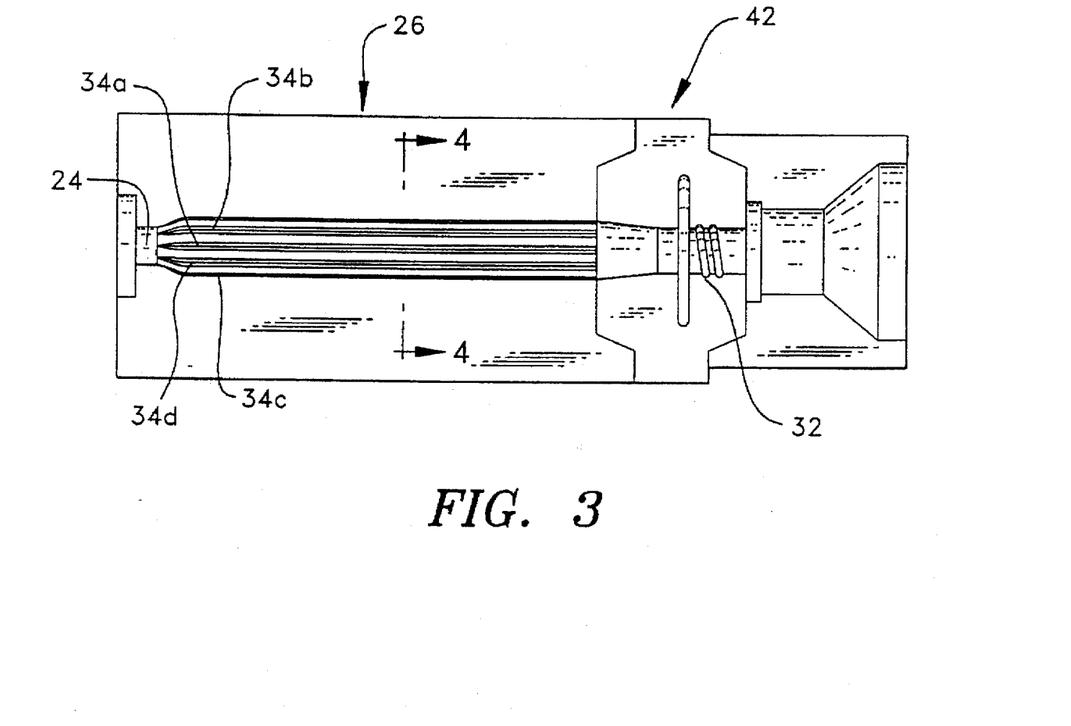
FIG. 3 is a plan view of the injection mold half of FIG. 2.
Figure 4:
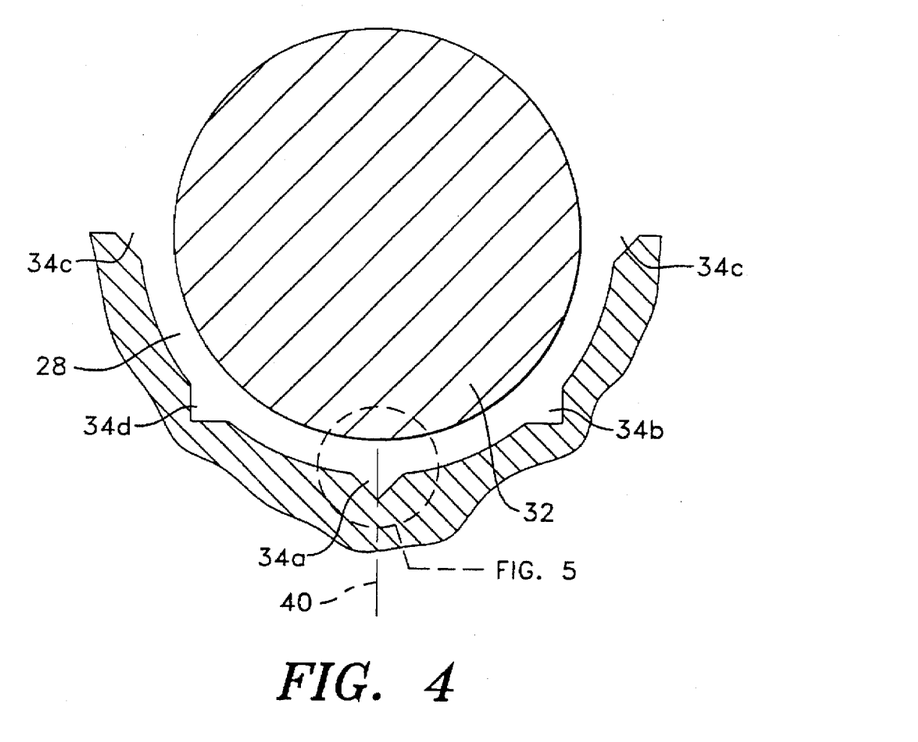
FIG. 4 is a cross-sectional view of the mold half of FIG. 3, taken along section lines 4—4, and shown in mating relationship with a second, mold half.

Referring next to FIGS. 3 and 4, the preferred form of the flutes 34, in accordance with the preferred embodiment of the present invention, will be described. As shown, the flutes 34 are formed in each of the respective preform cavity halves 26. Regardless of the number of flutes provided, it is important that the number of flutes be an even number. As shown in FIGS. 3 and 4, eight flutes are provided, four (34a, 34b, 34c and 34d) in each cavity half 26. The flutes 34 are arranged as diametrically opposed pairs of grooves in the cavity inner surface 26a. Thus, flute 34a in one cavity half 26 has a corresponding flute 34a in the second cavity half.

When forming a tubular multi-layer preform, a preform cavity 28 having a generally cylindrical cross-sectional area will be employed. The preform cavity 28 will have four pairs of fluted grooves 34a, 34b, 34c, and 34d arranged equiangularly around the cavity inner surface 26a continuing around the circumference of the cavity 26. The fluted grooves 34 are generally parallel to the cavity longitudinal axis. When four pairs of fluted grooves are provided, the fluted grooves are formed substantially at every 45 degrees around the circumference of the cavity 26. Each fluted groove of each pair is thus diametrically opposed to the other member of the pair. Although four pairs of fluted grooves are preferred, almost any number of pairs of fluted grooves may be formed in the cavity inner surface 27a, but no matter how many pairs of fluted grooves are formed, they should be arranged generally equiangularly around the cavity inner surface 26a and continue around the circumference of the cavity 26.

When the mold assembly 20 of the present invention is employed to produce a thin preform substrate in the first step of injection molding a multi-layer preform, the presence of flutes 34 increases the cross-sectional flow area in which the molten plastic flows within the preform cavity 28. This, in turn, allows the use of a reduced injection pressure and further reduces the flow resistance to the molten plastic material entering the preform cavity 28. This pressure and flow resistance reduction reduces the unwanted core-pin deflection mentioned above and allows molten plastic material to flow through and completely fill out the preform cavity 28 and the threaded mold portion 30 before the plastic material solidifies.

Figure 5:
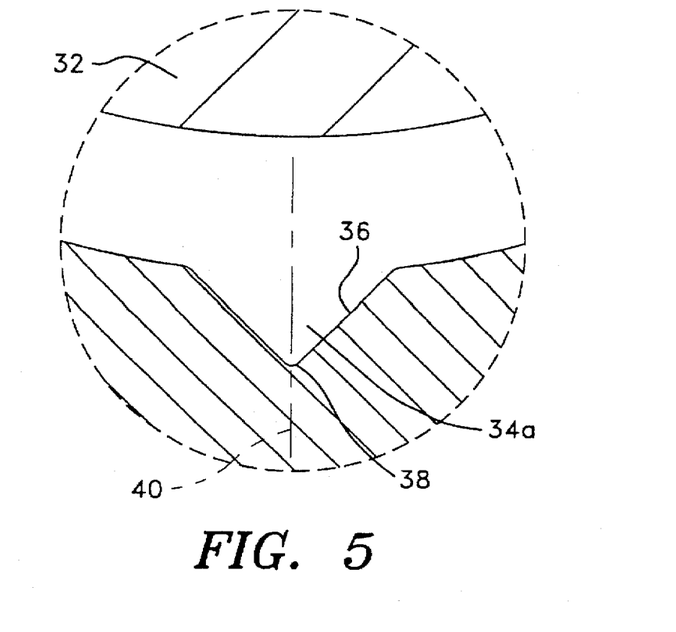
FIG. 5 is an enlarged view of one of the fluted grooves shown in FIG. 4.

Turning next to FIG. 5, the preferred fluted groove 34 configuration of FIG. 4 is shown in greater detail. Each individual fluted groove 34 is formed to a have sidewalls 36 joined at an apex 38. The apex 38 has a substantially radial curvature or radius to allow a molten plastic material to flow with less resistance into the outer edge of each fluted groove 34. The sidewalls 36 of each fluted groove 34 are formed at an approximately 90 degree angle with respect to each other and at a 45 degree angle relative to the axis 40 of the groove 34. Each sidewall is approximately 0.069 inches long from the point at which it intersects with the apex 38 to the innermost diameter of the mold half 26.

It is noted that the fluted groove configuration of FIGS. 3–5, in accordance with the preferred embodiment of the present invention, may be incorporated with any mold assembly employed to form preforms.

Figure 6:
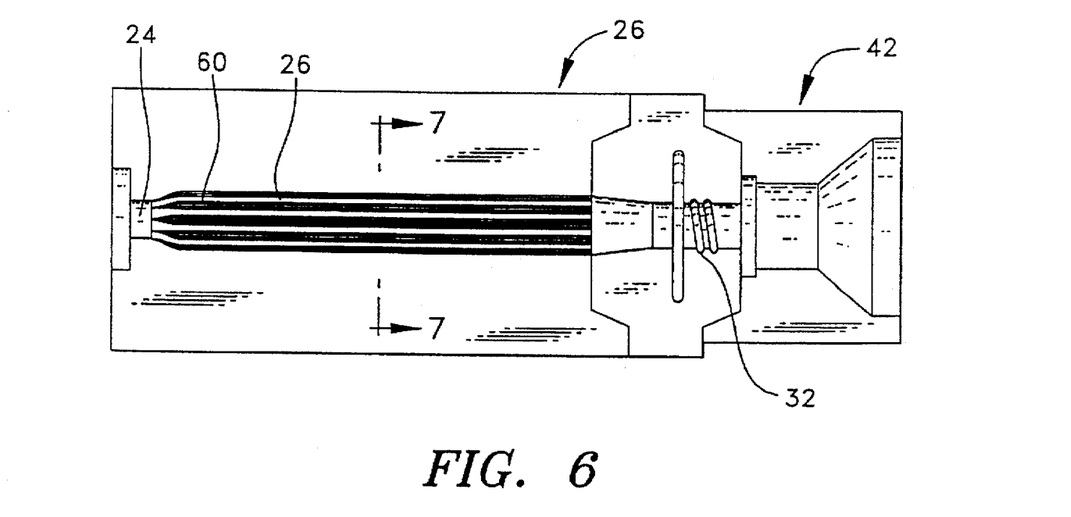
FIG. 6 is a plan-view of an injection mold half, similar to FIG. 3, but according to a second embodiment of the present invention.
Figure 7:
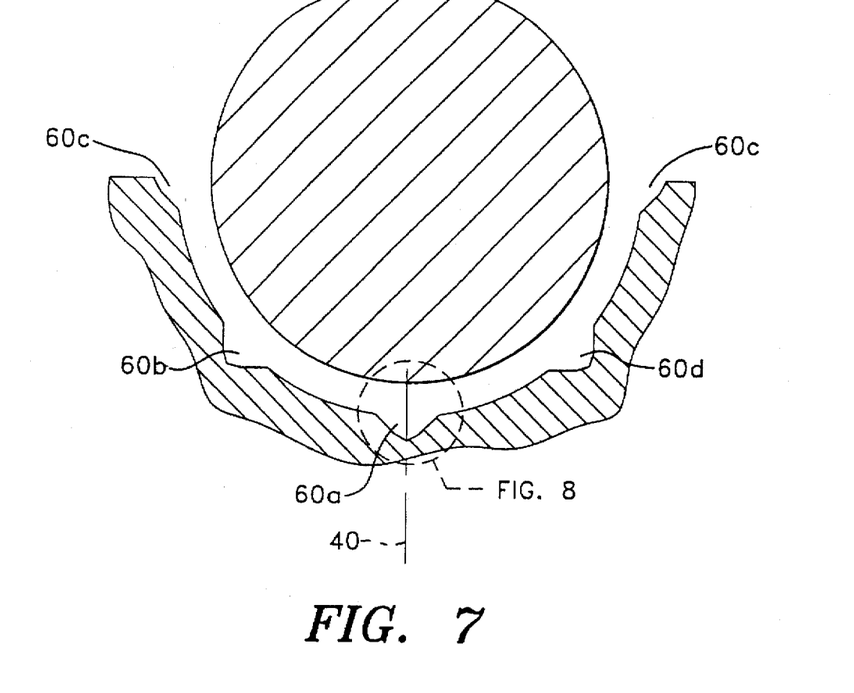
FIG. 7 is a cross-sectional view of the mold half of FIG. 6, taken along section lines 7—7, but again shown in mating relationship with a second, identical mold half.

Referring next to FIGS. 6 and 7, an alternative embodiment of the present invention will be seen. In accordance with this alternative embodiment, cavity half 26 is shown (it being understood that a corresponding mating cavity half, not shown, is also provided). Each of the cavity halves 26 is provided with flutes 60 connected between the gate 24 and the threadsplit portion 30. In accordance with this second embodiment of the invention, the flutes 60 have a different cross sectional configuration to those shown in connection with FIGS. 3–5. That configuration can best be seen in connection with FIGS. 7 and 8.

As shown in FIG. 7, eight flutes are provided, four (60a, 60b, 60c and 60d) in each cavity half 26. Again, the flutes 60 are arranged as diametrically opposed pairs of grooves. Again, each individual member of each of the four pairs of fluted grooves 60a, 60b, 60c, and 60d is formed substantially at every 45 degrees around the cavity inner surface 26a and continue around the circumference of the cavity 26 and diametrically opposed to the other member of the pair.

Figure 8:
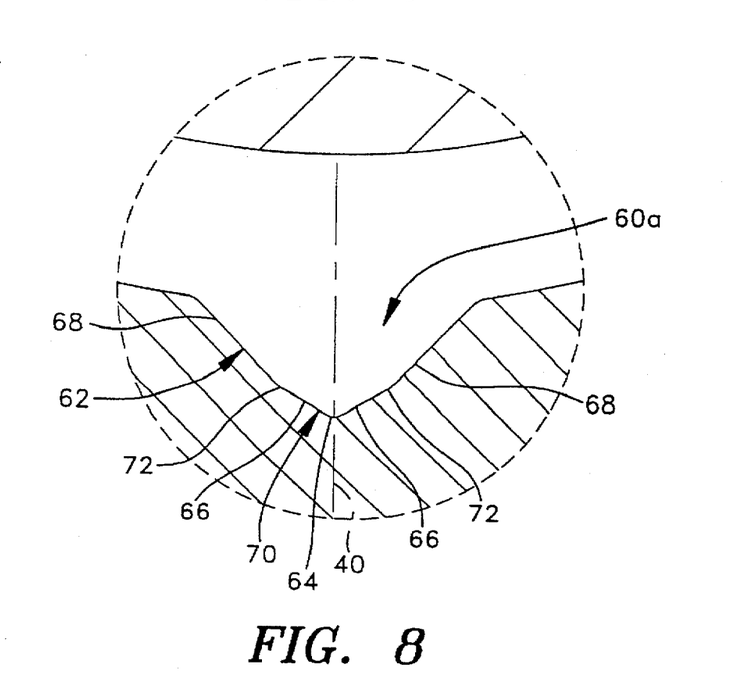
FIG. 8 is an enlarged view of one of the fluted grooves shown in FIG. 7.

Referring to FIG. 8, one of the fluted grooves 60a–d is shown in further detail. Each of the individual fluted grooves 60a–d of each pair is formed to have stepped sidewalls 62 joined at an apex 64. More particularly, as shown in FIG. 8, each of the stepped shaped sidewalls 62 have first segments 66 located adjacent the apex 64 and second segments 68 remote from the apex 64. Each of the first segments 66 has an apex end 70 abutting the apex 64 and an intersection end 72 abutting corresponding second segment 68. The first segments 66 are formed at an angle of approximately 120 degrees with respect to each other (or 60 degrees with respect to the axis 40 of the respective fluted groove), and continue from the apex 64 to the intersection end 72 where they join the second segment 68. The length of the first segment 66 is approximately 0.028 inches. Each second segment 68 is formed, beginning at the first segment intersection end 72, and continuing for approximately 0.0516 inches until reaching the innermost diameter of the cavity half 26. The second segments 68 are preferably formed at an angle of approximately 90 degrees with respect to each other (or 45 degrees relative to the axis 40). The dimensions of the alternative fluted groove configuration described in connection with FIGS. 6–8 above will be the same regardless of the desired final preform size or shape.

In accordance with the method aspect of the present invention, a first molten plastic material is injected through the nozzle 22 to the gate 24 of the preform mold assembly 20 and directed to the preform cavity 28. The type of resin employed will depend upon the product to be contained within the finished container. In accordance with the preferred embodiment of the present invention, the first thin layer of the multi-layer preform substrate comprises virgin PET material.

After injection the thin preform substrate is formed by injection molding, it is removed from the preform mold assembly 20 and transferred to a second injection molding apparatus. In the second injection molding apparatus, a second plastic resin material injection molded, i.e., overmolded, over the previously formed preform substrate, thus forming the second layer of the multi-layer preform. Preferably, the second plastic resin material comprises a recycled PET material. The second layer is bonds to the outer surface of the preform substrate and the multi-layer preform is formed as the molten plastic of the second layer cools and hardens.

Because of the aforementioned flutes used in accordance with the present invention the area of contact between the virgin material of the thin preform substrate and the outer layer of the multi-layer preform is greater than has been previously achieved. For this reason, better adhesion characteristics between the first and second layers of a multi-layer preform may be expected as compared to prior art multi-layer preforms. In this regard, it is noted that the second embodiment of the present invention as shown in FIGS. 6–8 may provide even better adhesion characteristics than the preferred embodiment of FIGS. 3–5 because the second embodiment provides even greater surface area contact between the respective layers. However, the second embodiment is expected to provide a thin preform substrate with a somewhat larger volume of a virgin plastic resin material than in the case of the first embodiment, and consequently, preforms made in accordance with the second embodiment may be more expensive than those made in accordance with the first embodiment.

When employing the preferred fluted groove configuration of FIGS. 3–5, the finished multi-layer preform may comprise up to 45% of a recycled plastic resin material and up to 55% of a virgin plastic resin material. In contrast, the alternative fluted groove configuration described in connection with FIGS. 6–8 may produce a multi-layer preform comprising up to 40% of a recycled plastic resin material and up to 60% of a virgin plastic resin material.

Other fluted groove embodiments may be designed in accordance with the present invention to produce multi-layer preforms comprising various ratios of virgin material and recycled material.

Figure 9:
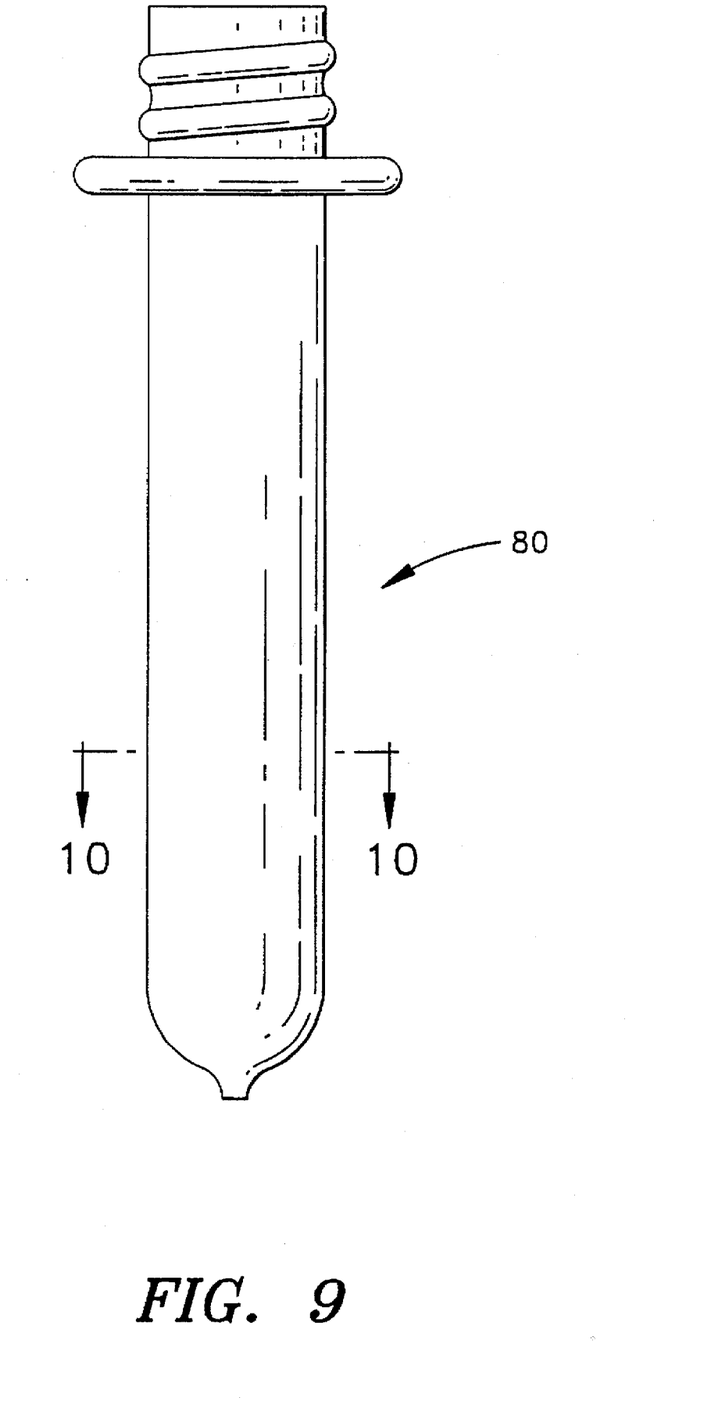
FIG. 9 is a perspective view of a multi-layer preform made in accordance with the present invention.
Figure 10:
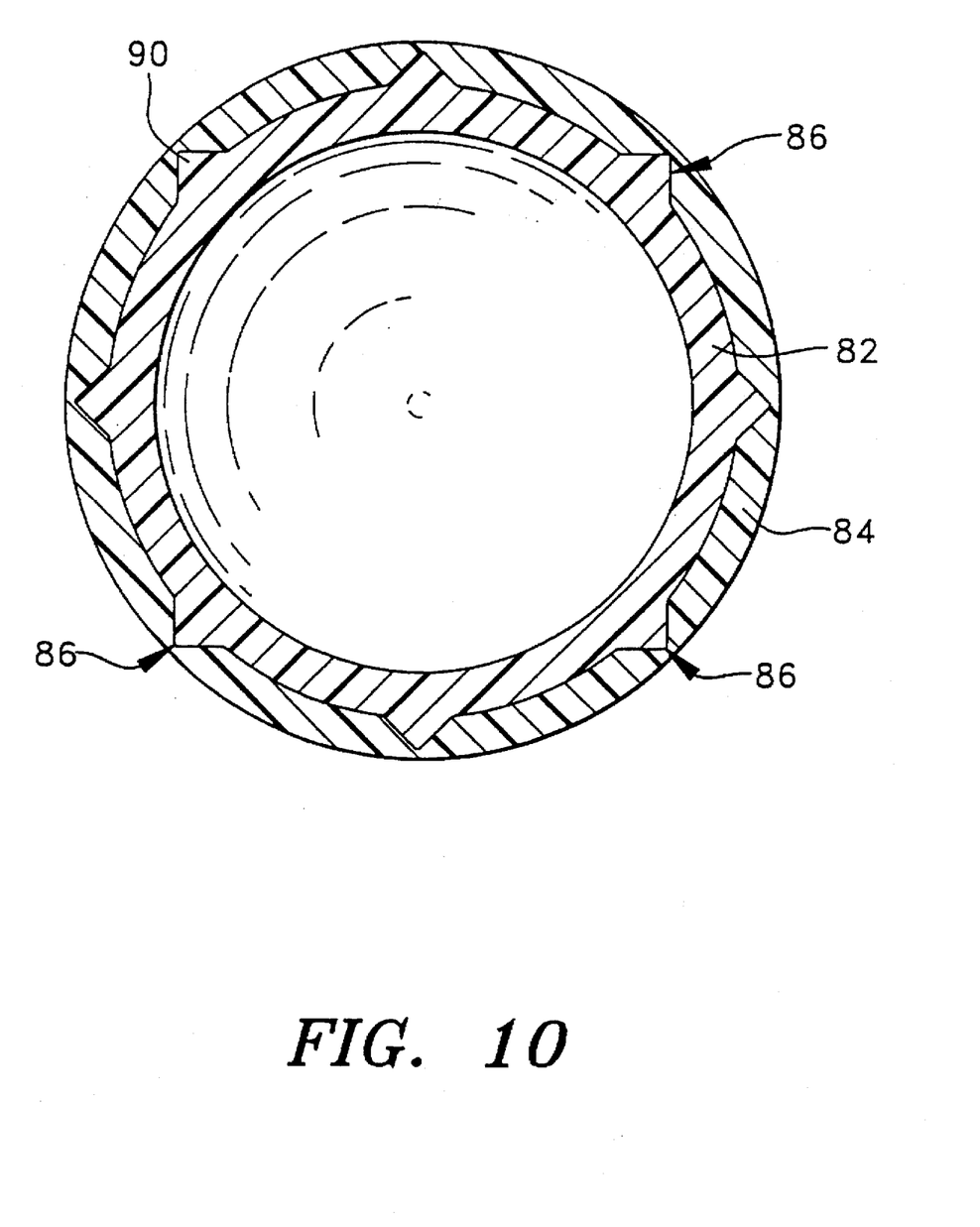
FIG. 10 is a cross-sectional view of the preform mold of FIG. 9, taken along section lines 10—10.

The method and apparatus described above will produce an improved multi-layer preform. As an example, FIGS. 9 and 10 illustrate a multi-layer preform 80 produced by employing the apparatus shown above. The improved multi-layer preform 80 comprises at least a first inner layer 82 made of a first plastic material. For a beverage or food container, it is preferable that the inner layer be made of a virgin PET material. The preform 80 further includes a second outer layer 84 made of a second plastic material. Although the second outer layer 84 can be made of any plastic resin material it is preferred that a recycled PET material be applied.

The first inner layer 82 and second outer layer 84 are joined together at a corrugated surface 86, as shown in FIG. 10. Each flute of the corrugated surface 86 has a side wall 90 and an axis 92. The corrugated surface 86 may have any even number of flutes as desired. Each flute in the corrugated surface 86 is arranged generally equiangularly around the circumference of the preform.

The multi-layer preforms produced by the method and apparatus described above provide a multi-layer preform which is expected to possess improved adhesion characteristics between the first inner layer 82 and second outer layer 84 because of the corrugated surfaces 86. The corrugated surfaces 86 provide an increased circumference and perimeter to which the second outer layer 84 can adhere. In addition, the multi-layer preform is expected to produce a blown container having increased strength in the axial direction because of the corrugated surfaces 86.

The first inner layer 82 and the second outer layer 84 of the multi-layer preform have approximately equal thicknesses, except in the regions of the flutes in the corrugated surface 86. Furthermore, approximately 20 percent of the second outer layer 84 thickness will be between the extreme outside diameter of the corrugated surfaces 86 and the extreme outer diameter of the preform first inner layer 82.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A preform mold assembly for the injection molding of a multi-layer preform for use in the blow molding of containers, said preform mold assembly comprising:

a preform mold having a gate for receiving molten plastic material and an opposing remote end, said preform mold having a cavity defining an inner surface;

a core-pin situated within said cavity and spaced from said inner surface;

a preform cavity formed between the inner surface of the cavity and the core-pin for receiving molten plastic from the gate;

said inner surface of the cavity having a plurality of flutes, said flutes beginning substantially proximate said gate and extending longitudinally along the cavity inner surface to a location substantially upstream from said gate and substantially proximate the remote end.

2. The preform mold assembly of claim 1 wherein:

said inner surface of the cavity includes an even number of flutes extending longitudinally along said inner surface.

3. The preform mold assembly of claim 2 wherein:

said inner surface of the cavity includes eight flutes each extending longitudinally from the gate along said inner surface.

4. The preform mold assembly of claim 2 wherein:

said flutes are arranged generally equiangularly around the circumference of said inner surface.

5. The preform mold assembly of claim 1 wherein:

each of said flutes comprises a groove having sidewalls joined at an apex.

6. The preform mold assembly of claim 5 wherein:

each of said flutes comprises a groove having sidewalls joined at an apex, said sidewalls being formed at an approximately 90 degree angle with respect to each other.

7. The preform mold assembly of claim 6 wherein:

each of said flutes comprises a groove having sidewalls joined at an apex, the apex having a substantially radial curvature.

8. The preform mold assembly of claim 1 wherein:

each of said flutes comprises a groove having stepped sidewalls joined at an apex.

9. The preform mold assembly of claim 8 wherein:

said stepped sidewalls have first segments located adjacent the apex and second segments remote from the apex.

10. The preform mold assembly of claim 9 wherein:

said first segments have an apex end abutting the apex and an intersection end abutting a corresponding second segment.

11. The preform mold assembly of claim 9 wherein:

said first segments are formed at an angle of approximately 120 degrees with respect to each other and the second segments are formed at an angle of approximately 90 degrees with respect to each other.

12. The preform mold assembly of claim 1 wherein:

a threadsplit portion is situated within said core at a location remote from said gate for use in the blow molding of containers having a threaded neck.

13. A preform mold assembly for the injection molding of a multi-layer preform for use in the blow molding of containers said preform mold assembly comprising:

a preform mold having a gate for receiving molten plastic material, said preform mold having a cavity defining an inner surface, said cavity having a longitudinal axis;

a core-pin situated within said cavity and spaced from said inner surface;

a preform cavity formed between the inner surface of the cavity and the core-pin for receiving molten plastic from the gate;

a threadsplit portion situated within said cavity at a location remote from said gate; and said inner surface of the cavity having a plurality of flutes formed beginning substantially proximate said gate and extending substantially upstream from said gate past an end of the threadsplit closest to the gate, said flutes formed generally parallel to said cavity longitudinal axis within said cavity inner surface.

14. The preform mold assembly of claim 13 wherein:

said inner surface of the cavity includes an even number of flutes extending longitudinally along said inner surface from said gate to said threadsplit portion.

15. The preform mold assembly of claim 14 wherein:

said inner surface of the cavity includes eight flutes each extending longitudinally along said inner wall.

16. The preform mold assembly of claim 14 wherein:

said flutes are arranged generally equiangularly around the circumference of said inner surface.

17. The preform mold assembly of claim 13 wherein:

each of said flutes comprises a groove having sidewalls joined at an apex.

18. The preform mold assembly of claim 17 wherein:

said sidewalls are formed at an approximately 90 degree angle with respect to each other.

19. The preform mold assembly of claim 16 wherein:

said apex has a substantially radial curvature to allow a molten plastic resin to flow with less resistance along the flow path.

20. The preform mold assembly of claim 13 wherein:

each of said flutes comprises a groove having stepped sidewalls joined at an apex.

21. The preform mold assembly of claim 20 wherein:

said stepped sidewalls have first segments located adjacent the apex and second segments remote from the apex.

22. The preform mold assembly of claim 21 wherein:

said first segments has an apex end abutting the apex and an intersection end abutting a corresponding second segment.

23. The preform mold assembly of claim 22 wherein:

said first segments are formed at an angle of approximately 120 degrees with respect to each other and the second segments are formed at an angle of approximately 90 degrees with respect to each other.

24. The preform mold assembly of claim 13 wherein:

said flutes extend longitudinally along the inner surface of the mold to the threadsplit portion.

25. A method of injection molding a multi-layer preform for use in the blow molding of containers, said method comprising the steps of:

providing a first preform mold assembly having a gate for receiving molten plastic material and a cavity defining an inner surface having a remote end opposing said gate, a core-pin situated within said cavity, and a preform cavity formed between the inner surface of the cavity and the core-pin for receiving molten plastic material from the gate, said inner surface of the cavity having a plurality of flutes, said flutes beginning substantially proximate said gate and extending longitudinally along the inner surface of the mold substantially upstream from said gate to a location substantially proximate said remote end;

injecting a first molten plastic material through said gate and into the preform mold cavity to form a thin preform substrate;

injecting a second molten plastic material over said preform substrate to form the second layer of a multi-layer perform; and removing the multi-layer preform from the second injection mold.

26. The method of claim 25 wherein said step of injecting a first molten plastic material further comprises the step of:

injecting virgin PET material to form the thin preform substrate.

27. The method of claim 26 wherein said step of injecting a second molten plastic material further comprises step of:

injecting molten recycled plastic material over said preform substrate to form the second layer of the multi-layer perform.

28. The method of claim 25 wherein said step of providing a first preform mold assembly having a plurality of flutes extending longitudinally along the inner surface of the mold further comprises:

providing a preform mold wherein each of said flutes is arranged generally equiangularly around the circumference of said inner surface.

29. A method of injection molding a multi-layer preform for use in the blow molding of containers, said method comprising the steps of:

providing a first preform mold assembly having a gate for receiving molten plastic material, a cavity defining an inner surface, a core-pin situated within said cavity, a preform cavity formed between the inner surface of the cavity and the core-pin for receiving molten plastic material from the gate, and a threadsplit portion situated within said cavity at a location remote from said gate, said inner surface of the cavity having a plurality of flutes, said flutes beginning substantially proximate the gate and extending longitudinally from the gate to the cavity inner surface and extending substantially upstream from the gate to a location past an end of the threadsplit closest to the gate;

injecting a first molten plastic material through the gate, into said cavity and along said flutes to the location passed the end of the threadsplit closest to the gate, to form a thin preform substrate;

removing the thin preform substrate from the mold;

inserting the thin preform substrate in a second injection mold;

injecting a second molten plastic material into the second injection mold and over said preform substrate to form the second layer of a multi-layer perform; and removing the multi-layer preform from the second injection mold.

30. The method of claim 29 wherein said step of injecting a first molten plastic material further comprises the step of:

injecting molten virgin PET material to form a thin preform substrate.

31. The method of claim 29 wherein said step of injecting a second molten plastic material further comprises step of:

injecting molten recycled plastic material over said preform substrate to form the second layer of a multi-layer perform.

32. The method of claim 29 wherein said step of providing a first preform mold assembly having a plurality of flutes extending longitudinally from the gate along the inner surface of the cavity inner surface further comprises:

providing a preform mold wherein each of said flutes is arranged generally equiangularly around the circumference of said inner surface.

33. An improved multi-layer preform comprising:
   at least a first inner layer of a first plastic material, said first inner layer having a gate end and a remote end, said layer having an outer corrugated surface, said corrugated surface defining a plurality of flutes, said flutes beginning substantially proximate said gate end extending longitudinally substantially upstream from the gate end to a location substantially proximate said remote end; and
   a second outer layer of a second plastic material overmolded upon the first layer, said second outer layer being joined to said first layer at the corrugated surface.

34. The multi-layer preform of claim 33 wherein said inner layer is virgin PET material.

35. The multi-layer preform of claim 33 wherein said inner layer is virgin PET material and said outer layer is recycled PET.

36. The multi-layer preform of claim 33 wherein:
   said corrugated surface has an even number of flutes.

37. The multi-layer preform of claim 33 wherein:
   each of said flutes is arranged generally equiangularly around said corrugated surface.

38. The multi-layer preform of claim 35 wherein:
   said first inner layer and the second outer layer have approximately equal thicknesses, except in the regions of the flutes in the corrugated surface, and wherein approximately 20 percent of the second outer layer thickness is between the extreme outside diameter of the corrugated surfaces and the extreme outer diameter of the preform first inner layer.

* * * * *